US012394545B2

(12) United States Patent
Yen et al.

(10) Patent No.: US 12,394,545 B2
(45) Date of Patent: Aug. 19, 2025

(54) OVER-CURRENT PROTECTION DEVICE

(71) Applicant: Polytronics Technology Corp., Hsinchu (TW)

(72) Inventors: Hsiu-Che Yen, Taoyuan (TW); Yung-Hsien Chang, Douliu (TW); Cheng-Yu Tung, Tainan (TW); Chia-Yuan Lee, Hsinchu (TW); Chen-Nan Liu, Pitou Township, Changhua Township (TW); Yao-Te Chang, Linnei Township, Yunlin County (TW); Fu-Hua Chu, Taipei (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 351 days.

(21) Appl. No.: 18/177,681

(22) Filed: Mar. 2, 2023

(65) Prior Publication Data

US 2024/0127988 A1 Apr. 18, 2024

(30) Foreign Application Priority Data

Oct. 17, 2022 (TW) ................................. 111139212

(51) Int. Cl.
*H01C 7/02* (2006.01)

(52) U.S. Cl.
CPC ............. *H01C 7/021* (2013.01); *H01C 7/028* (2013.01)

(58) Field of Classification Search
CPC ................................ H01C 7/021; H01C 7/028
See application file for complete search history.

(56) References Cited

U.S. PATENT DOCUMENTS

2019/0306970 A1 10/2019 Yang et al.
2024/0127989 A1* 4/2024 Lee ........................ H01C 7/028

FOREIGN PATENT DOCUMENTS

CN 101162632 * 4/2008
CN 101162632 A 4/2008
CN 109741891 A 5/2019
CN 112210176 * 1/2021 .............. C08J 3/246
KR 102253983 * 5/2021

OTHER PUBLICATIONS

CN-101162632 translation (Year: 2008).*
CN-112210176 translation (Year: 2021).*
KR-102253983 translation (Year: 2021).*

* cited by examiner

*Primary Examiner* — Kyung S Lee
(74) *Attorney, Agent, or Firm* — Muncy, Geissler, Olds & Lowe, P.C.

(57) ABSTRACT

An over-current protection device includes a first metal layer, a second metal layer and a heat-sensitive layer laminated therebetween. The heat-sensitive layer exhibits a positive temperature coefficient (PTC) characteristic and includes a first polymer and a conductive filler. The first polymer consists of polyvinylidene difluoride (PVDF), and PVDF exists in different phases such as α-PVDF, β-PVDF and γ-PVDF. The total amount of α-PVDF, β-PVDF and γ-PVDF is calculated as 100%, and the amount of α-PVDF accounts for 48% to 55%. The conductive filler has a metal-ceramic compound.

18 Claims, 2 Drawing Sheets

OVER-CURRENT PROTECTION DEVICE

BACKGROUND OF THE INVENTION

(1) Field of the Invention

The present application relates to an over-current protection device, and more specifically, to an over-current protection device for high temperature application having low electrical resistivity and excellent voltage endurance capability.

(2) Description of the Related Art

Because the electrical resistance of conductive composite materials having a positive temperature coefficient (PTC) characteristic is very sensitive to temperature variation, they can be used as the materials for current sensing devices and have been widely applied to over-current protection devices or circuit devices. More specifically, the electrical resistance of the PTC conductive composite material remains extremely low at normal temperatures, so that the circuit or cell can operate normally. However, when an over-current or an over-temperature situation occurs in the circuit or cell, the electrical resistance will instantaneously increase to a high electrical resistance state (e.g., at least above $10^4\Omega$), which is the so-called "trip". Therefore, the over-current will be eliminated so as to protect the cell or the circuit device.

The basic structure of the over-current protection device consists of a PTC material layer with two electrodes bonded to two opposite sides of the PTC material layer. The PTC material includes a matrix and a conductive filler. The matrix generally consists of one or more polymers, and the conductive filler is uniformly dispersed in the matrix and is used as an electrically conductive path. Recently, the over-current protection device may include a polymer with high melting point, such as a polyvinylidene difluoride (PVDF), as the matrix for application at high temperature condition; and the conductive filler may include an electrically conductive ceramic material with metallic content for reducing electrical resistivity. However, additional additives are conventionally added in order to further improve the voltage endurance capability of the over-current protection device. The additional additives usually make the formulation design complicated. For example, compatibility between the additional additives, polymers, and the conductive filler must be taken into consideration; after considering the compatibility and deciding desirable additives, the proportion between the polymers and the conductive filler needs to be adjusted properly in order to maintain excellent electric characteristics. In the time of fast-changing technologies, the formulation is frequently improved on the prior basis. However, the more compounds the formulation has, the more complex the formulation design is.

PVDF possesses many physical/chemical properties, but it still needs breakthroughs to improve voltage endurance capability. For example, the main crystalline phases of PVDF are α phase, β phase, and γ phase, and PVDF in these three phases may be referred to as α-PVDF, β-PVDF, and γ-PVDF, respectively. Regarding the three crystalline phases of PVDF, the application mainly focuses on piezoelectricity or ferroelectricity of β-PVDF, but functionality of α-PVDF and γ-PVDF has not been sufficiently investigated, not to mention their applications in improvement of voltage endurance capability.

Accordingly, there are needs to improve voltage endurance capability of the over-current protection device with low electrical resistivity and for high temperature application.

SUMMARY OF THE INVENTION

The present invention provides an over-current protection device which can be applied at high temperature, and has low electrical resistivity and excellent voltage endurance capability. The present invention selects polyvinylidene difluoride (PVDF) as a matrix with high melting point, and further adjusts the proportion among crystalline phases existing in PVDF, by which the over-current protection device with low electrical resistivity may have excellent voltage endurance capability during the operation at high temperature. In addition, the over-current protection device may recover back to low electrical resistance after tripping many times under high temperature. In this way, thermal stability and voltage endurance capability of the over-current protection device can be improved without help of additional additives.

In accordance with an aspect of the present invention, an over-current protection device includes a first metal layer, a second metal layer, and a heat-sensitive layer laminated between the first metal layer and the second metal layer. The heat-sensitive layer exhibits a positive temperature coefficient (PTC) characteristic and includes a first polymer and a conductive filler. The first polymer consists of polyvinylidene difluoride (PVDF), wherein PVDF has a plurality of crystalline phases including α-PVDF, β-PVDF and γ-PVDF. The total amount of α-PVDF, β-PVDF and γ-PVDF is calculated as 100%, and the amount of α-PVDF accounts for 48% to 55%. The conductive filler includes a metal-ceramic compound and is dispersed in the first polymer, thereby forming an electrically conductive path in the heat-sensitive layer.

In an embodiment, the amount of γ-PVDF accounts for less than 39%.

In an embodiment, a percentage value by dividing the amount of γ-PVDF by the amount of α-PVDF accounts for 65% to 78%.

In an embodiment, the amount of β-PVDF accounts for 10% to 13%.

In an embodiment, the amount of α-PVDF accounts for 54% to 55% In an embodiment, the volume of the heat-sensitive layer is calculated as 100%, and the first polymer accounts for 40% to 44% by volume.

In an embodiment, the metal-ceramic compound is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof. The volume of the heat-sensitive layer is calculated as 100%, and the metal-ceramic compound accounts for 35% to 45% by volume.

In an embodiment, the metal-ceramic compound is tungsten carbide.

In an embodiment, the conductive filler further includes carbon black.

In an embodiment, the heat-sensitive layer further includes a flame retardant, and the flame retardant does not contain magnesium hydroxide.

In an embodiment, the flame retardant is a perovskite-based material selected from the group consisting of $BaTiO_3$, $SrTiO_3$, $CaTiO_3$, and any combination thereof.

In an embodiment, the heat-sensitive layer further includes a second polymer, and the conductive filler is dispersed in the first polymer and the second polymer, wherein the second polymer is a fluoropolymer selected from the group consisting of polytetrafluoroethylene, ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

In an embodiment, the second polymer is polytetrafluoroethylene.

In an embodiment, the over-current protection device has a thickness ranging from 0.26 mm to 1.1 mm, and has an electrical resistivity ranging from 0.03 Ω·cm to 0.06 Ω·cm.

In an embodiment, the over-current protection device has the thickness of 0.75 mm, and has the electrical resistivity ranging from 0.03 Ω·cm to 0.04 Ω·cm.

In an embodiment, the over-current protection device has a first electrical characteristic, and the first electrical characteristic is a voltage-endurance value of at least 36V.

In an embodiment, the over-current protection device has a second electrical characteristic, and the second electrical characteristic is a ratio of resistance jump ranging from 1.9 to 2.8.

In an embodiment, the over-current protection device has a top-view area ranging from 7.5 $mm^2$ to 63 $mm^2$, and an endurable power per unit area ranges from 4.3 $W/mm^2$ to 5.4 $W/mm^2$.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
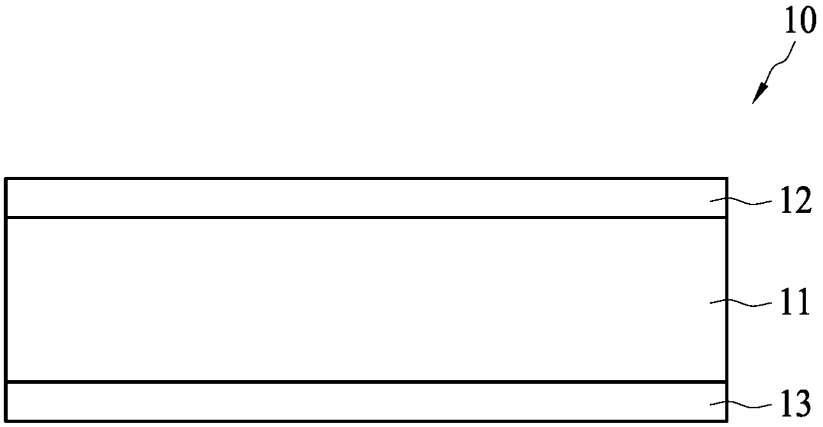
FIG. 1 shows a cross-sectional view of an over-current protection device in accordance with an embodiment of the present invention.

Please refer to FIG. 1. FIG. 1 shows one basic aspect of an over-current protection device of the present invention in cross-sectional view. The over-current protection device 10 includes a first metal layer 12, a second metal layer 13, and a heat-sensitive layer 11 laminated between the first metal layer 12 and the second metal layer 13. In an embodiment, the first metal layer 12 and the second metal layer 13 may be composed of the nickel-plated copper foils or other conductive metals. The heat-sensitive layer 11 exhibits a positive temperature coefficient (PTC) characteristic, and includes a first polymer and a conductive filler. The first polymer functions as a polymer matrix of the heat-sensitive layer 11, and the conductive filler includes a metal-ceramic compound and is dispersed in such polymer matrix, thereby forming an electrically conductive path in the heat-sensitive layer 11. Therefore, in the present invention, the heat-sensitive layer 11 is a PTC material layer exhibiting PTC characteristic. In addition, the conductive filler includes the metal-ceramic compound as its major constituent for the purpose of reducing electrical resistivity. That is, the present invention is aimed to improvement of the over-current protection device with low electrical resistivity. The "over-current protection device with low electrical resistivity" may be referred to as "LR over-current protection device" hereinafter for simplicity. The "LR" stands for low rho (ρ), which means low electrical resistivity.

The volume of the heat-sensitive layer is calculated as 100%, and the first polymer accounts for 40% to 44% by volume. The first polymer consists of polyvinylidene difluoride (PVDF). In addition, PVDF has many crystalline phases, and the present invention further adjusts the proportion among crystalline phases (i.e., α-phase, β-phase, and γ-phase) existing in PVDF. PVDF in these three phases may be referred to as α-PVDF, β-PVDF, and γ-PVDF, respectively. Each phase of PVDF is determined by its stereo configuration, that is, polymer chains of each phase have an arrangement of trans (T) and gauche (G) different from each other. α-PVDF is characterized by TGTG conformation, and it is the most stable nonpolar structure; β-PVDF is characterized by TTTT conformation, which is a polar structure; and γ-PVDF is characterized by TTTGTTTG conformation, which is a polar structure. Different methods (e.g., stretching process, thermal treatment, irradiation treatment, electrical polarization treatment, and/or various polymerization methods) may be performed to obtain different PVDF with different proportion of the crystalline phases. The aforementioned polymerization method may be emulsion polymerization or suspension polymerization. After irradiation, the amount of α-PVDF, the amount of β-PVDF, and the amount of γ-PVDF are analyzed by X-ray Diffractometer (XRD).

In the present invention, any one of the amount of α-PVDF, the amount of β-PVDF, and the amount of γ-PVDF would influence electrical characteristics of the over-current protection device 10. In particular, it is well observed that α-PVDF may play a major role in the improvement of electrical resistance stability and voltage endurance capability of the LR over-current protection device 10. More specifically, the present invention selects β-PVDF as "control variable" and α-PVDF as "independent variable" in the experiment. The amount of β-PVDF is controlled in the specified range from about 10% to 13% of the total amount of three crystalline phases, and the present invention analyzes the influence of α-PVDF on electrical characteristics when fluctuating in its abundance. The total amount of α-PVDF, β-PVDF and γ-PVDF is calculated as 100%, and the amount of α-PVDF accounts for 48% to 55%. If the amount of α-PVDF is lower than 48%, the issue of microphase separation between PVDF and the metal-ceramic compound arises. The issue may come from crystalline size of PVDF. α-PVDF is the most stable nonpolar structure of PVDF, and hence crystalline size of α-PVDF is relatively large during crystallization. In contrast, γ-PVDF has the unstable polar structure, and crystalline size of γ-PVDF is relatively small during crystallization. Under an equal amount of crystalline phase, the exposed interface area of γ-PVDF (i.e., interface between γ-PVDF and amorphous region of PVDF) would be larger than the exposed interface area of α-PVDF (i.e., interface between α-PVDF and amorphous region of PVDF) because the number of smaller crystals of γ-PVDF is more than the number of larger crystals of α-PVDF. However, it is noted that the conductive filler includes the metal-ceramic compound as its major constituent, and the metal-ceramic compound easily accumulates at the interface owing to its poor dispersion and poor compatibility when compared with carbon black. If the interface area is larger, the situation that the metal-ceramic compound accumulates at the interface is more severe. More specifically, particles of the metal-ceramic compound have larger size and density than carbon black and thus are prone to sedimentation, and the metal-ceramic compound exhibits poor dispersion in and poor compatibility with polymer when compared with carbon black. Because of the aforementioned poor dispersion and poor compatibility, the metal-ceramic compound easily accumulates at the interface, which may lead to microphase separation of the metal-ceramic compound from PVDF. In other words, if the amount of α-PVDF decreases too much (e.g., lower than 48%), the ratio between crystalline region and amorphous region (crystalline region divided by amorphous region) increases and accumulation of the metal-ceramic compound becomes severe. It may cause spark over and burnout of the device when applied with high voltage. Obviously, insufficient amount of α-PVDF would compromise voltage endurance capability of the over-current protection device. However, the amount of α-PVDF should not be too much. If the amount of α-PVDF is higher than 55%, amorphous region available for accommodation of the metal-ceramic compound is limited and the excessive amount of metal-ceramic compound accumulates at the periphery around PVDF. Such non-homogeneous distribution may also cause spark over due to high concentration of energy when applied with high voltage, and thus excessive amount of α-PVDF would also compromise voltage endurance capability of the over-current protection device. In an embodiment, the amount of α-PVDF is adjusted in the range from 54% to 55% in order to address the issue of resistance jump (defined and explained later) of the over-current protection device 10, and therefore the over-current protection device 10 has the best resistance recovery capability. That is, the over-current protection device has excellent repeatability of electrical resistance, and its electrical resistance may recover back to initial electrical resistance as close as possible after tripping many times.

Moreover, the electrical characteristics of the over-current protection device 10 are not determined by a single crystalline phase as described above. Under the circumstance that the amount of β-PVDF maintains in a specific range, increase (or decrease) of the amount of α-PVDF corresponds to decrease (or increase) of the amount of γ-PVDF. In the present invention, relative amount between γ-PVDF and α-PVDF is also shown to further distinguish the difference between the present invention and the conventional over-current protection device. More specifically, the total amount of α-PVDF, β-PVDF and γ-PVDF is calculated as 100%, and the amount of γ-PVDF accounts for less than 39%. When the amount of γ-PVDF accounts for less than 39%, a percentage value by dividing the amount of γ-PVDF by the amount of α-PVDF (i.e., γ-PVDF/α-PVDF) accounts for 65% to 78%. The higher the γ-PVDF/α-PVDF is, the higher the ratio of resistance jump of the over-current protection device 10 will be, and high ratio of resistance jump means that resistance recovery capability is poor. In an embodiment, the aforementioned ratio of γ-PVDF/α-PVDF may be 65%, 68%, 70%, 72%, 74%, 76%, or 78%. In a preferred embodiment, the aforementioned ratio of γ-PVDF/α-PVDF is adjusted in the range from 65% to 68% in order to obtain the best voltage endurance capability and resistance recovery capability (i.e., the lowest ratio of resistance jump) of the over-current protection device 10.

The heat-sensitive layer 11 may further include a second polymer, and the second polymer functions as a part of the polymer matrix described above. The conductive filler is dispersed in the polymer matrix formed of the first polymer and the second polymer, thereby forming the electrically conductive path in the heat-sensitive layer 11. The second polymer may preferably be a fluoropolymer selected from the group consisting of polytetrafluoroethylene, ethylene-tetrafluoroethylene copolymer, tetrafluoroethylene-hexafluoro-propylene copolymer, perfluoroalkoxy modified tetrafluoroethylenes, poly(chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof. For example, the second polymer may be polytetrafluoroethylene (PTFE). In the present invention, PVDF is the major constituent of the polymer matrix, and PTFE is the minor constituent of the polymer matrix. That is, the amount of PVDF is higher than that of PTFE. The volume of the heat-sensitive layer 11 is calculated as 100%, and PTFE accounts for 4% to 5% by volume. In an embodiment, the volume of the heat-sensitive layer 11 is calculated as 100%, and PTFE accounts for 4%, 4.2%, 4.4%, 4.6%, 4.8%, or 5% by volume. The melting point of PTFE is higher than that of PVDF, and thus PTFE can fine-tune thermal stability of the polymer matrix. More specifically, the melting point of PVDF ranges from 170° C. to 178° C., and the melting point of PTFE ranges from 320° C. to 335° C. During the low-temperature process, PVDF melts but PTFE does not, if the process temperature (e.g., 250° C.) for manufacturing the over-current protection device 10 or the reflow temperature is higher than the melting point of PVDF but lower than the melting point of PTFE. In this way, particles of PTFE remain in the solid state, and are uniformly dispersed in the heat-sensitive layer 11, thereby forming nucleation sites for PVDF. It is favorable to recrystallization of PVDF. Moreover, deformation of PTFE is less severe under high temperature condition because of its high melting temperature, by which the structure of the heat-sensitive layer 11 is stabilized by PTFE and does not deform severely. Because of the advantages of recrystallization, prevention of deformation, or other favorable properties in connection to high melting point, PTFE can effectively increase the stability of electrical resistance and voltage endurance capability of the over-current protection device 10.

As for the conductive filler, the present invention selects the metal-ceramic compound, rather than carbon black, as the major constituent of the conductive filler for better electrical conduction. The volume of the heat-sensitive layer 11 is calculated as 100%, and the metal-ceramic compound accounts for 35% to 45% by volume. The metal-ceramic compound is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof. In an embodiment, the conductive filler of the over-current protection device 10 may include carbon black in small amounts in order to exhibit better voltage endurance capability. For example, the volume of the heat-sensitive layer 11 is calculated as 100%, and carbon black accounts for 4% by volume. In addition, inventors of the present invention find that a combination of metal carbide (especially tungsten carbide) and carbon black can be used in the conductive filler, and such combination makes the over-current protection device 10 have low electrical resistivity and excellent voltage endurance capability.

In order to enhance flame resistance of the over-current protection device 10, the heat-sensitive layer 11 further includes a flame retardant. Conventionally, the over-current protection device with carbon black filler (i.e., conductive filler including carbon black as its major constituent) preferably uses magnesium hydroxide as the flame retardant. However, in the present invention, other inner fillers (except magnesium hydroxide) may be adopted, and thus both flame retardancy and voltage endurance capability of the LR over-current protection device 10 can be further enhanced. In an embodiment, the flame retardant of over-current protection device 10 does not contain magnesium hydroxide, but contains a perovskite-based material as its major constituent. The volume of the heat-sensitive layer 11 is calculated as 100%, and the perovskite-based material accounts for 8% to 10% by volume. More specifically, the perovskite-based material may be one or more compounds having a general formula represented by $MTiO_3$. The "M" in this general formula can be transition metal or alkaline earth metal. The transition metal may be manganese (Mn), and the alkaline earth metal may be beryllium (Be), magnesium (Mg), calcium (Ca), strontium (Sr), barium (Ba), or radium (Ra). In an embodiment, the perovskite-based material is selected from the group consisting of $BaTiO_3$, $SrTiO_3$, $CaTiO_3$, and any combination thereof.

It is noted that the over-current protection device 10 can be made to have an extremely thin thickness (about 0.26 mm to 1.1 mm) while maintaining a low electrical resistivity (ρ) ranging from 0.03 Ω·cm to 0.06 Ω·cm. In an embodiment, the over-current protection device 10 has the thickness of 0.75 mm, and the electrical resistivity (ρ) thereof is adjusted in a narrow range from 0.03 Ω·cm to 0.04 Ω·cm. The over-current protection device 10 of the present invention can be made to have the thickness described above, and still has excellent electrical characteristics. For example, the over-current protection device 10 may have at least two excellent electrical characteristics (referred to as a first electrical characteristic and a second electrical characteristic hereinafter). The first electrical characteristic is a voltage-endurance value of at least 36V. Conventionally, the voltage-endurance value of the LR over-current protection device is in the range from 24V to 30V. The device is likely to be burnt out under the applied voltage above 30V, and cannot pass the cycle life test (100 cycles) with applied voltage above 36V. However, the over-current protection device 10 of the present invention may have the thickness far less than 1.1 mm and withstand a high voltage of above 36V without burnout. The second electrical characteristic is a ratio of resistance jump ranging from 1.9 to 2.8. The ratio of resistance is jump can be an index for assessing the stability of electrical resistance of the over-current protection device. For example, the over-current protection device 10 has a first electrical resistance before the cycle life test under room temperature. After tripping of device with many cycles, the over-current protection device 10 has a second electrical resistance when cooled back to room temperature. A value obtained by dividing the second electrical resistance by the first electrical resistance is the ratio of resistance jump. The smaller the ratio of resistance jump is, the better the resistance recovery capability of the over-current protection device 10 will be. In a preferred embodiment, the cycle number of the cycle life test is 100, and the ratio of resistance jump ranges from 1.9 to 2.1. That is, after 100 cycles of the cycle life test, the over-current protection device 10 is not burnt out and still can recover from high electrical resistance to return to low electrical resistance, the electrical resistance increases only 1.9-2.1 times over the initial electrical resistance.

Figure 2:
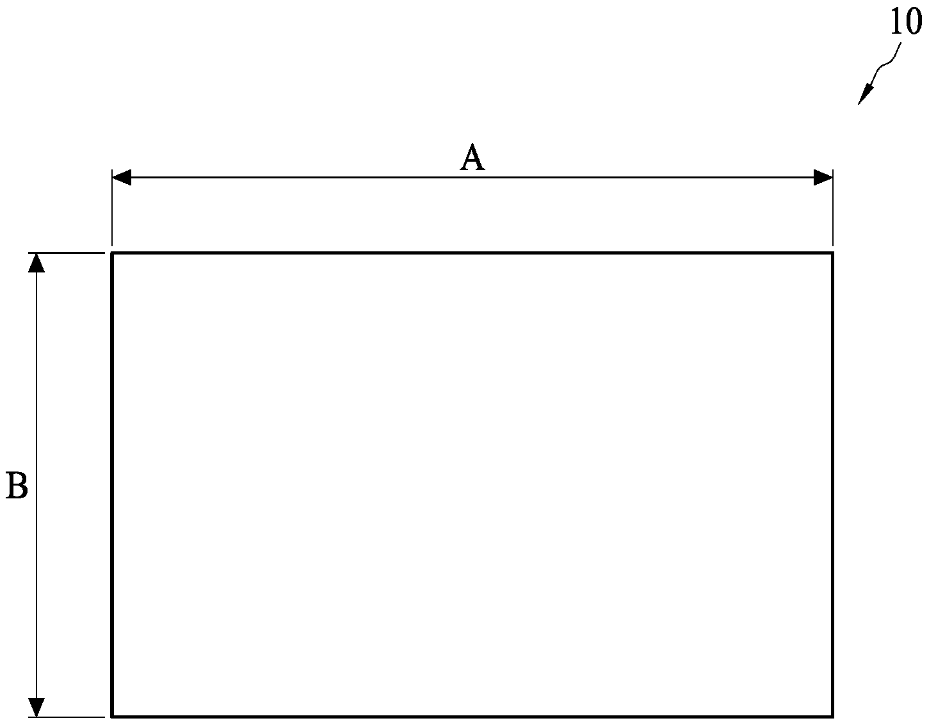
FIG. 2 shows the top view of the over-current protection device shown in FIG. 1.

Please refer to FIG. 2, it shows the top view of the over-current protection device 10 shown in FIG. 1. The over-current protection device 10 has a length A and a width B, and the top-view area "A×B" of the over-current protection device 10 is substantially equivalent to the top-view area of the heat-sensitive layer 11. The heat-sensitive layer 11 may have a top-view area ranging from 7.5 $mm^2$ to 63 $mm^2$ based on different products having different sizes. For example, the top-view area "A×B" may be 2.5×3 $mm^2$, 5×7 $mm^2$, 6×7 $mm^2$, 7×7 $mm^2$, 9×7 $mm^2$, 7.62×9.35 $mm^2$, or 8×9 $mm^2$.

In addition, the over-current protection device 10 of the present invention can withstand higher power when compared with the conventional over-current protection device. Taking the size of 5×7 $mm^2$ as an example, the over-current protection device 10 has an endurable power per unit area ranging from 4.3 $W/mm^2$ to 5.4 $W/mm^2$.

As described above, the over-current protection device 10 of the present invention has the excellent electrical characteristics under high temperature. It could be verified according to the experimental data in Table 1 to Table 4 as shown below.

TABLE 1

Volume percentage (vol %) of the heat-sensitive layer.

| | PVDF | PTFE | $BaTiO_3$ | CB | WC |
|---|---|---|---|---|---|
| heat-sensitive layer | 42 | 5 | 9 | 4 | 40 |

TABLE 2

Proportion among the crystalline phases of PVDF.

| Group | α | β | γ | γ/α |
|---|---|---|---|---|
| E1 | 54.3% | 10.0% | 35.8% | 65.86% |
| E2 | 49.3% | 12.5% | 38.2% | 77.54% |
| E3 | 50.2% | 11.0% | 38.7% | 77.06% |
| C1 | 46.2% | 11.7% | 42.1% | 91.24% |
| C2 | 46.7% | 12.0% | 41.3% | 88.53% |

Please refer to Table 1, in which shows the composition to form the heat-sensitive layer 11 by volume percentages. In the experiment, the heat-sensitive layer 11 is made of polyvinylidene difluoride (PVDF), polytetrafluoroethylene (PTFE), barium titanate ($BaTiO_3$), carbon black (CB), and tungsten carbide (WC). PVDF and PTFE together form a polymer matrix of the heat-sensitive layer 11, and carbon black and tungsten carbide are dispersed in the polymer matrix and together function as a conductive path. In addition, barium titanate is adopted as an inner filler for enhancement of voltage endurance capability, and it possesses the property of flame retardancy in the meantime. Accordingly, there is no need to add the magnesium hydroxide, which is conventionally used as the flame retardant, in the heat-sensitive layer 11. It is noted that, in consideration of better electrical conduction, tungsten carbide is the major constituent and carbon black is the minor constituent of the conductive filler. The combination of tungsten carbide and carbon black may also be referred to as a type of LR system's conductive fillers. Moreover, different samples of PVDF with different proportions of crystalline phases are provided from supplier, and are divided into five groups for further analysis, in which their exact proportions are shown in Table 2. In other words, the composition of the present invention is aimed to the adjustment of physical/chemical properties of PVDF, and such adjustment is further verified when the conductive filler is under LR system.

According to the composition shown in Table 1, materials are formulated and put into HAAKE twin screw blender for blending. The blending temperature is 215° C., the time for pre-mixing is 3 minutes, and the blending time is 15 minutes. The conductive polymer after being blended is pressed into a sheet by a hot press machine at a temperature of 210° C. and a pressure of 150 $kg/cm^2$. The sheet is then cut into pieces of about 20 cm×20 cm, and two nickel-plated copper foils are laminated to two sides of the sheet with the hot press machine at a temperature of 210° C. and a pressure of 150 $kg/cm^2$, by which a three-layered structure is formed. Then, the sheet with the nickel-plated copper foils is punched into PTC chips, each of which is the over-current protection device of the present invention. Each sample of the over-current protection device has the length of 5 mm and the width of 7 mm (i.e., top-view area is 35 $mm^2$), and the thickness thereof is 0.75 mm.

Figure 3:
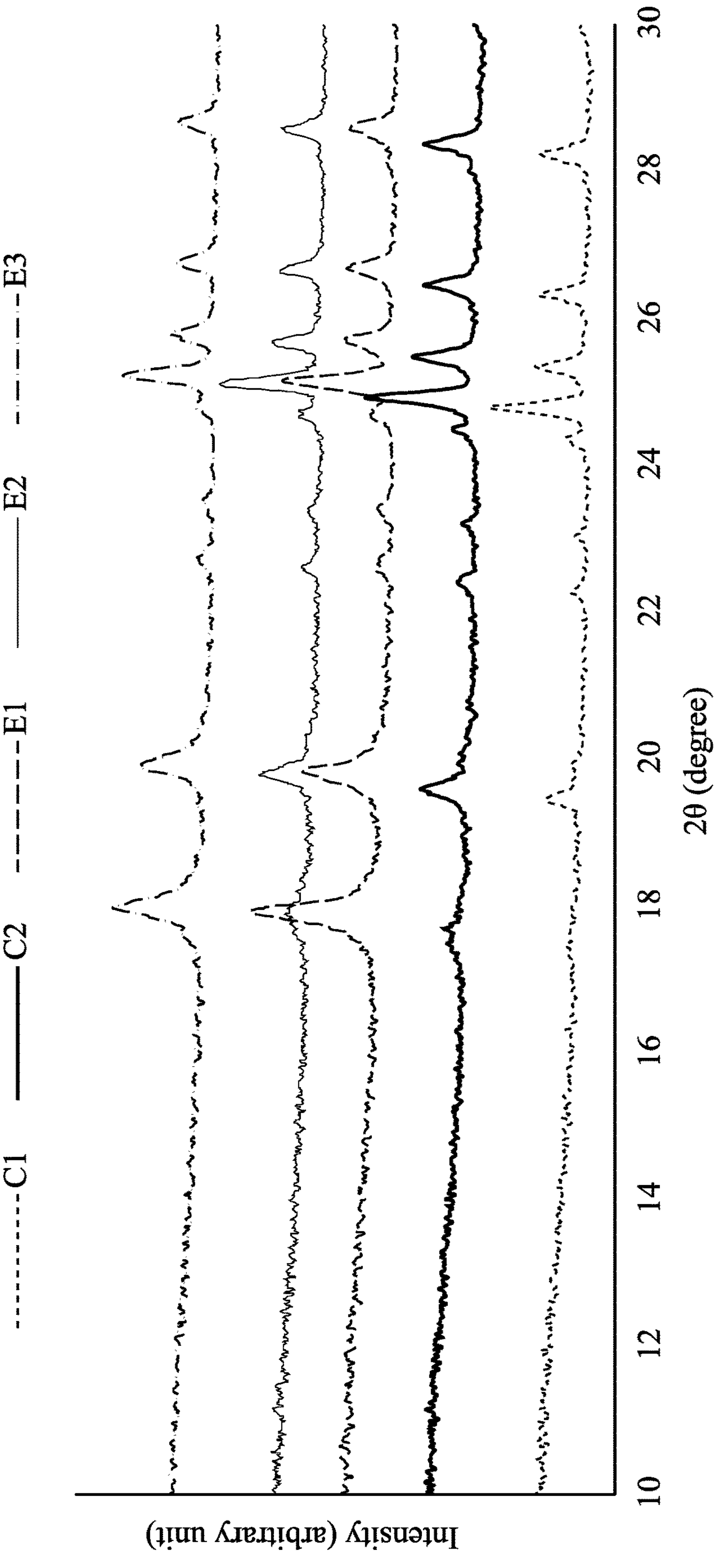
FIG. 3 shows XRD analysis of PVDF.

Before measurement of electrical characteristics, each group is analyzed by X-ray Diffractometer (XRD) to confirm the proportion among three crystalline phases in each group. Please refer to FIG. 3, in which shows results of XRD analysis. The horizontal axis indicates the diffraction angle (2θ) represented by "degree (°)", and the vertical axis indicates the intensity represented by "arbitrary unit (a.u.)." The diffraction angles (2θ) of α-PVDF are 26.56°, 19.9°, 18.3°, and 17.6°; the diffraction angle (2θ) of β-PVDF is 20.26°; and the diffraction angles (2θ) of γ-PVDF are 20.02°, 19.2°, and 18.5°. In FIG. 3, the intensity of each group is normalized and an XRD pattern with five curves is obtained, these five curves correspond to comparative embodiment C1, comparative embodiment C2, embodiment E1, embodiment E2, and embodiment E3 from bottom to top, respectively. It is observed that the XRD pattern of each group shows similar peaks, but there are obvious increases in intensity corresponding to the diffraction angles of α-PVDF in the embodiments E1 to E3, especially to 19.9° in the embodiments E1 and E3.

For better understanding the differences in crystalline structure among these test groups, the results of XRD analysis are converted to percentages shown in the above Table 2. The total amount (i.e., intensity as described above) of α-PVDF, β-PVDF, and γ-PVDF is calculated as 100% in each group, and different percentages of α-PVDF, β-PVDF, and γ-PVDF can be obtained. In Table 2, the amount of β-PVDF is controlled in the range from 10% to 13%, and hence the influence of other two crystalline phases can be further investigated. In the embodiments E1 to E3, the amount of α-PVDF is in the range from 49.3% to 54.3%, and the amount of γ-PVDF is in the range from 35.8% to 38.7%. In the comparative embodiments C1 to C2, the amount of α-PVDF is in the range from 46.2% to 46.7%, and the amount of γ-PVDF is in the range from 41.3% to 42.1%. From the above, it is clear that the embodiments E1 to E3 contain higher amount of α-PVDF and lower amount of γ-PVDF; and the comparative embodiments C1 to C2 contain lower amount of α-PVDF and higher amount of γ-PVDF in comparison. Accordingly, a relative percentage value between the amount of α-PVDF and the amount of γ-PVDF is also calculated, and it would be more clear to show the difference from each other in the test groups. That is, the amount of γ-PVDF is divided by the amount of α-PVDF (i.e., γ-PVDF/α-PVDF) to give a relative value, and such relative value is converted and expressed in percentage to obtain the relative percentage value as shown in Table 2. In the embodiments E1 to E3, the ratio of γ-PVDF/α-PVDF (γ/α) is relatively lower and ranges from 65.86% to 77.54%. In the comparative embodiments C1 to C2, the ratio of γ-PVDF/α-PVDF is relatively higher and ranges from 88.53% to 91.24%. It is noted that considering the measurement error in the embodiments E1 to E3, the amount of α-PVDF may range from about 48% to 55%, the ratio of γ-PVDF/α-PVDF may range from about 65% to 78%, and the same technical effect can be achieved in the above ranges.

After analysis and confirmation of the proportion of the crystalline phases, each group is verified by five samples of the over-current protection device.

TABLE 3

Cycle life test.

| Group | $R_i$ (Ω) | $R_1$ (Ω) | $\rho_1$ (Ω · cm) | 100 C | $R_{100\ C}$ | $R_{100\ C}/R_1$ |
|---|---|---|---|---|---|---|
| E1 | 4.60 | 8.57 | 0.0400 | Pass | 17.12 | 2.00 |
| E2 | 4.85 | 8.08 | 0.0377 | Pass | 17.33 | 2.14 |
| E3 | 5.06 | 11.37 | 0.0531 | Pass | 32.64 | 2.87 |
| C1 | 4.92 | 11.36 | 0.0530 | Fail | — | — |
| C2 | 4.95 | 11.46 | 0.0535 | Fail | — | — |

In Table 3, the first row shows items to be tested from left to right.

"$R_i$" refers to initial electrical resistance of the over-current protection device at room temperature.

"$R_1$" refers to the electrical resistance in respect of the first time that the over-current protection device is tripped and cooled back to room temperature. More specifically, the lead wire may be further welded to the over-current protection device, and the welding temperature causes trip of device. Moreover, the electrical resistance formula is $\rho=R\times A/L$. "R" is electrical resistance, "L" is length (thickness), and "A" is cross sectional area. Accordingly, the electrical resistivity of $\rho_1$ can be calculated corresponding to $R_1$.

"100C" refers to test cycles of a cycle life test. One cycle of the cycle life includes applying voltage/current at 36V/30 A for 10 seconds and turning it off for 60 seconds (i.e., on: 10 seconds; off: 60 seconds). It is observed whether the over-current protection device is burnt out after 100 cycles. "Pass" means that the over-current protection device is not burnt out, and "Fail" means that the over-current protection device is burnt out.

"$R_{100}$" refers to the electrical resistance of the over-current protection device after 100 cycles of the cycle life test, the electrical resistance of which is then measured when cooled back to room temperature. Therefore, a ratio of resistance jump ($R_{100C}/R_1$) after 100 cycles of the cycle life test can be calculated. The smaller the value (ratio of resistance jump) is, the better the resistance recovery capability of the over-current protection device will be. The over-current protection device with small ratio of resistance jump has better capability for electrical resistance recovery from trip of device toward the low electrical resistance. In other words, the ratio of resistance jump can be an index for assessing the stability of electrical resistance.

As described above, the embodiments E1 to E3 are adjusted to have higher amount of α-PVDF. In Table 3, it is observed that the embodiments E1 to E3 may have lower electrical resistivity ($\rho_1$) ranging from 0.03 Ω·cm to 0.06 Ω·cm if the lead wire is welded to the device. Moreover, in terms of the relative ratio of γ-PVDF/α-PVDF, the over-current protection device exhibits better capability for electrical resistance recovery if the amount of γ-PVDF is adjusted to be lower (i.e., the amount of α-PVDF is relatively higher). The embodiment E1 include the highest amount of α-PVDF and the lowest ratio of γ-PVDF/α-PVDF, and therefore its ratio of resistance jump ($R_{100C}/R_1$) can be lowered down to 2, which means the embodiment E1 has the best capability for electrical resistance recovery in all the embodiments. In other words, the over-current protection device can have the best capability for electrical resistance recovery if the amount of α-PVDF is adjusted in the range from about 54% to 55% or the ratio of γ-PVDF/α-PVDF is further adjusted in the range from about 65% to 68%. As to comparative embodiments C1 to C2, the amount of α-PVDF is lowered down to about 46%, and the ratio of γ-PVDF/α-PVDF is up to about 88% to 92%. Therefore, the over-current protection device of the comparative embodiments C1 to C2 have higher electrical resistivity ($\rho_1$) in average and cannot pass the cycle life test (100 cycles).

Subsequently, other electrical characteristics are tested for further verification of the thermal stability and voltage endurance capability, as shown in Table 4 below. It is noted that the applied voltage/current in the following experiment is still 36V/30 A. The comparative embodiments C1 to C2 shows burnout under the above applied voltage/current, and therefore no results of the comparative embodiments are available shown in Table 4.

TABLE 4

Other electrical characteristics.

| Group | $I\text{-}T_{25^\circ C.}$ (A) | $I\text{-}T_{125^\circ C.}$ (A) | $I\text{-}T_{125^\circ C.}/I\text{-}T_{25^\circ C.}$ | $I\text{-}T_{25^\circ C.}$/area (A/mm$^2$) | $P_{25^\circ C.}$/area (W/mm$^2$) |
|---|---|---|---|---|---|
| E1 | 4.88 | 1.55 | 0.32 | 0.139 | 5.02 |
| E2 | 5.18 | 1.62 | 0.31 | 0.148 | 5.33 |
| E3 | 4.32 | 1.52 | 0.35 | 0.123 | 4.44 |

As shown in Table 4, the first row shows items to be tested from left to right.

"$I\text{-}T_{25^\circ C.}$" refers to trip current of the over-current protection device under the environmental temperature of 25° C.

"$I\text{-}T_{125^\circ C.}$" refers to trip current of the over-current protection device under the environmental temperature of 125° C.

"$I\text{-}T_{125^\circ C.}/I\text{-}T_{25^\circ C.}$" is used to compare different trip currents under different environmental temperatures, thereby observing the severity of thermal derating that the trip current decreases as the environmental temperature increases. The lower the value of "$I\text{-}T_{125^\circ C.}/I\text{-}T_{25^\circ C.}$" is, the more severe the thermal derating is, and vice versa.

"$I\text{-}T_{25^\circ C.}$/area" refers to endurable current per unit area of the over-current protection device under the environmental temperature of 25° C.

"$P_{25^\circ C.}$/area" refers to endurable power per unit area of the over-current protection device under the environmental temperature of 25° C.

In Table 4, the embodiments E1 to E3 have $I\text{-}T_{125^\circ C.}/I\text{-}T_{25^\circ C.}$ ranging from 0.31 to 0.35, and $P_{25^\circ C.}$/area ranging from 4.44 W/mm$^2$ to 5.33 W/mm$^2$. It is observed that $I\text{-}T_{125^\circ C.}/I\text{-}T_{25^\circ C.}$ is in the range lower than 1, and it means that thermal derating of the over-current protection device occurs as the environmental temperature increases. The higher the temperature is, the closer the critical point for trip of device will be. Therefore, the current needed for trip of device is correspondingly lowered as the temperature increases. Under high temperature, the over-current protection device with excellent thermal stability can maintain its electrical resistance as close to the initial electrical resistance as possible, and the current needed for trip of device correspondingly and only changes little as the temperature goes up. The attention should be drawn to the applied voltage again. Even though thermal derating occurs in the embodiments E1 to E3, their structural integrity may still remain intact without burnout during the operation under high voltage. From the above, it is clear that both thermal derating and voltage-endurance value of the device are in the effective range to be able to function optimally, that is, both thermal stability and voltage endurance capability of the device are excellent. In comparison, the over-current protection devices of the comparative embodiments C1 to C2 are burnt out under the same high voltage, not to mention the measurement of electrical characteristics shown in Table 4. To sum up, the over-current protection devices 10 of the embodiments E1 to E3 can be made in a thin size, and withstand the high applied power ranging from 4.44 W/mm$^2$ to 5.33 W/mm$^2$ without burnout. The over-current protection device 10 has excellent thermal stability and voltage endurance capability.

Accordingly, the present invention provides a LR over-current protection device which can be applied at high temperature and has excellent voltage endurance capability. This type of over-current protection device is thinner and can withstand the applied high voltage (at least 36V) without burnout. More specifically, the present invention selects polyvinylidene difluoride (PVDF) as a matrix with high melting point, and further adjusts the proportion among crystalline phases existing in PVDF, by which such LR over-current protection device has excellent voltage endurance capability during the operation at high temperature. Also, the LR over-current protection device may recover back to low electrical resistance after tripping many times under high temperature. In this way, thermal stability and voltage endurance capability of the LR over-current protection device can be improved without help of additional additives.

The above-described embodiments of the present invention are intended to be illustrative only. Numerous alternative embodiments may be devised by persons skilled in the art without departing from the scope of the following claims.

What is claimed is:

1. An over-current protection device, comprising:

a first metal layer;

a second metal layer; and a heat-sensitive layer laminated between the first metal layer and the second metal layer, the heat-sensitive layer exhibiting a positive temperature coefficient (PTC) characteristic and comprising:

a first polymer consisting of polyvinylidene difluoride (PVDF), wherein PVDF has a plurality of crystalline phases comprising α-PVDF, β-PVDF and γ-PVDF, wherein the total amount of α-PVDF, β-PVDF and γ-PVDF is calculated as 100%, and the amount of α-PVDF accounts for 48% to 55%; and a conductive filler comprising a metal-ceramic compound and dispersed in the first polymer, thereby forming an electrically conductive path in the heat-sensitive layer.

2. The over-current protection device of claim 1, wherein the amount of γ-PVDF accounts for less than 39%.

3. The over-current protection device of claim 2, wherein a percentage value by dividing the amount of γ-PVDF by the amount of α-PVDF accounts for 65% to 78%.

4. The over-current protection device of claim 3, wherein the amount of β-PVDF accounts for 10% to 13%.

5. The over-current protection device of claim 1, wherein the amount of α-PVDF accounts for 54% to 55%.

6. The over-current protection device of claim 1, wherein the volume of the heat-sensitive layer is calculated as 100%, and the first polymer accounts for 40% to 44% by volume.

7. The over-current protection device of claim 6, wherein the metal-ceramic compound is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof, and wherein the volume of the heat-sensitive layer is calculated as 100%, and the metal-ceramic compound accounts for 35% to 45% by volume.

8. The over-current protection device of claim 7, wherein the metal-ceramic compound is tungsten carbide.

9. The over-current protection device of claim 8, wherein the conductive filler further comprises carbon black.

10. The over-current protection device of claim 9, wherein the heat-sensitive layer further comprises a flame retardant, and the flame retardant does not contain magnesium hydroxide.

11. The over-current protection device of claim 10, wherein the flame retardant is a perovskite-based material selected from the group consisting of $BaTiO_3$, $SrTiO_3$, $CaTiO_3$, and any combination thereof.

12. The over-current protection device of claim 11, wherein the heat-sensitive layer further comprises a second polymer, and the conductive filler is dispersed in the first polymer and the second polymer, wherein the second polymer is a fluoropolymer selected from the group consisting of polytetrafluoroethylene, ethylene-tetrafluoroethylene copolymer, tetrafluoroethylene-hexafluoro-propylene copolymer, perfluoroalkoxy modified tetrafluoroethylenes, poly (chlorotri-fluorotetrafluoroethylene), vinylidene fluoride-tetrafluoroethylene copolymer, tetrafluoroethylene-perfluorodioxole copolymer, vinylidene fluoride-hexafluoropropylene copolymer, vinylidene fluoride-hexafluoropropylene-tetrafluoroethylene terpolymer, and any combination thereof.

13. The over-current protection device of claim 12, wherein the second polymer is polytetrafluoroethylene.

14. The over-current protection device of claim 1, wherein the over-current protection device has a thickness ranging from 0.26 mm to 1.1 mm, and has an electrical resistivity ranging from 0.03 Ω·cm to 0.06 Ω·cm.

15. The over-current protection device of claim 14, wherein the over-current protection device has the thickness of 0.75 mm, and has the electrical resistivity ranging from 0.03 Ω·cm to 0.04 Ω·cm.

16. The over-current protection device of claim 14, wherein the over-current protection device has a first electrical characteristic, and the first electrical characteristic is a voltage-endurance value of at least 36V.

17. The over-current protection device of claim 14, wherein the over-current protection device has a second electrical characteristic, and the second electrical characteristic is a ratio of resistance jump ranging from 1.9 to 2.8.

18. The over-current protection device of claim 1, wherein the over-current protection device has a top-view area ranging from 7.5 $mm^2$ to 63 $mm^2$, and an endurable power per unit area ranges from 4.3 $W/mm^2$ to 5.4 $W/mm^2$.

* * * * *